Nov. 18, 1941.                H. H. MOSS                 2,263,272
                STEEL BEAM AND METHOD OF MAKING SAME
                    Filed March 18, 1933         2 Sheets-Sheet 1

INVENTOR
HERBERT H. MOSS
BY
ATTORNEY

Nov. 18, 1941.   H. H. MOSS   2,263,272
STEEL BEAM AND METHOD OF MAKING SAME
Filed March 18, 1933   2 Sheets-Sheet 2
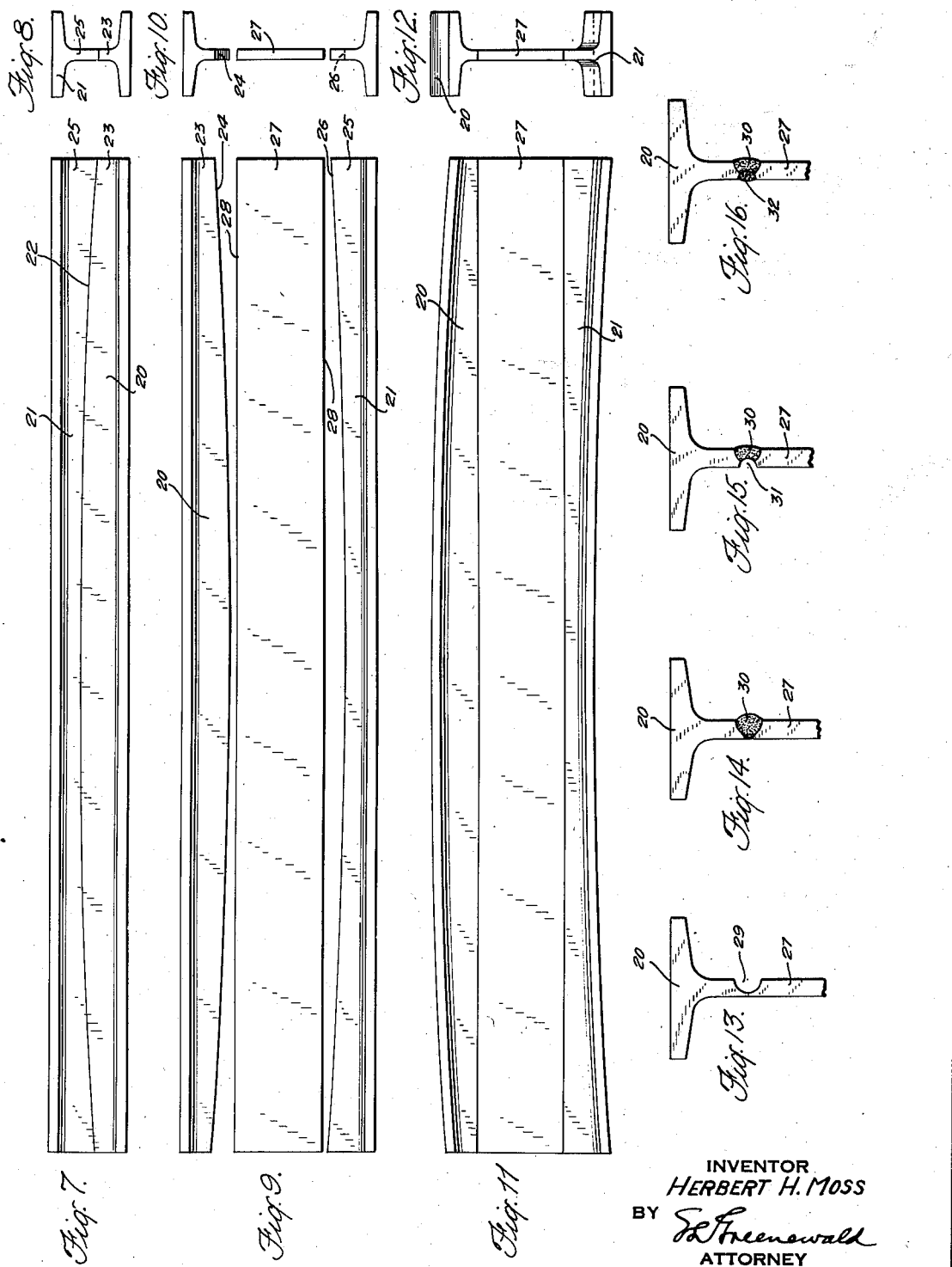
INVENTOR
HERBERT H. MOSS
BY
ATTORNEY Patented Nov. 18, 1941

2,263,272

UNITED STATES PATENT OFFICE 2,263,272

STEEL BEAM AND METHOD OF MAKING SAME

Herbert H. Moss, Brooklyn, N. Y., assignor, by mesne assignments, to Union Carbide and Carbon Corporation, a corporation of New York Application March 18, 1933, Serial No. 661,450

8 Claims. (Cl. 29—155)

My invention relates to built-up steel beams having solid webs or inserted web members joined to flange members by continuous butt welds. My invention relates particularly to girders having depths and/or web dimensions greater than standard rolled beams, and the method of fabricating same.

Integrally rolled steel beams cannot be economically produced in small quantities. In practice their manufacture requires that they either be rolled in large quantities and stocked or that their manufacture await the accumulation of orders in appreciable quantities. The large steel beams of the depth required for girders are difficult to roll. Large and expensive rolls are required to produce them and beyond certain dimensions it is not practicable to roll steel beams in one piece or produce a camber in such rolled steel beams which is sometimes desired.

Heretofore where welded construction has been employed in the fabrication of built-up girders, the flange plates and web plates have been united by fillet welded joints employing two lines of weld metal, one on each side of the web at the junction of the web and the flanges. This fillet welded type of construction from the viewpoint of strength does not utilize the weld metal in the most efficient manner since the weld metal is not disposed in a centric position in reference to the web, and the stresses are not carried from the flange plates to the web plate within the planes of the latter. Furthermore, from the welder's viewpoint, a fillet welded joint is not the most suitable form of welded joint with which to unite plates disposed at right angles to each other, especially when there is a great difference in the thickness of the two plates.

Light weight or secondary beams having an open or lattice work web united to the flange portions of the beam with a butt weld have been made. This type of beam is unsuitable for primary beams such as girders and it is not well suited to automatic continuous welding processes.

In accordance with my invention large or small beams may be made from stock material with the same standard cutting and welding equipment which is relatively inexpensive as compared to rolling mill equipment. Furthermore, the large built-up beams may be made in small lots in accordance with my process without much greater unit cost than when they are made in large quantities.

The principal object of my invention is to increase the strength per unit weight of built-up beams and to facilitate the manufacture of such beams, having a solid web formed from stock material, by butt welding the longitudinal beam members and the stock material together so as to position the weld metal centrically in reference to the planes of the web.

Another object of my invention is to produce a camber in a steel beam, having the additional characteristics of a beam of the rolled type, in which the metal forming the union between the web and flange members is disposed within the plane of the web.

The above and other objects of my invention will be better understood from the following description and the accompanying drawings, in which, Figs. 1 and 2 are respectively side and end elevations of one end of the assembled members of the beam in position to prepare the seams to be welded;

Figs. 7 and 8 are respectively side and end elevations of a beam from which T sections have been cut to produce a cambered-beam;

Figs. 9 and 10 are respectively side and end elevations of the assembled members of the beam in position to have the T sections bent to produce a cambered-beam;

Figs. 11 and 12 are respectively side and end elevations of the beam members clamped in the position of the completed beam;

Figs. 13 to 16 are fragmentary end views of the assembled beam members illustrating the several operations of preparing the edges of the beam members and welding them together.

The beam may be made of one or more flange sections and a web section secured thereto by a butt welded joint which may be of a known type, such as the single or double open square, V or U type.

Figure 1:
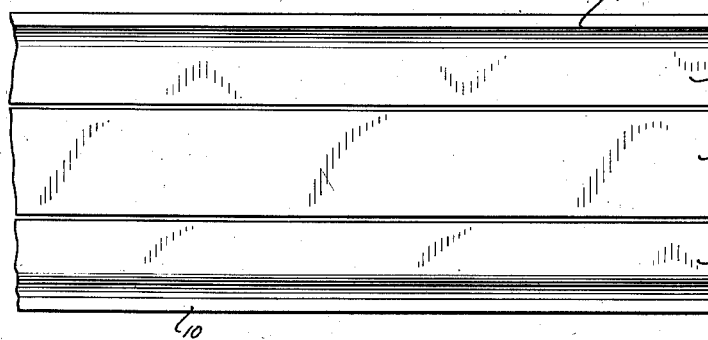
Figure 2:
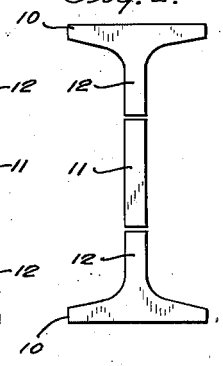
Figure 3:
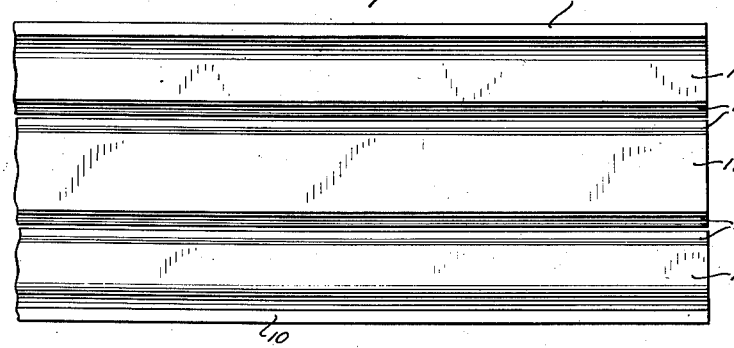
Figs. 3 and 4 are respectively side and end elevations of one end of the beam members in which the seams have been prepared for welding the members together.
Figure 4:
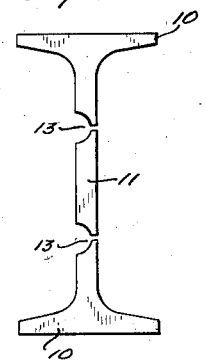

As shown in Figs. 1 and 2, a rolled T section 10 is placed on each side of a plate 11 so that the stems 12 of the T sections provide plate portions which are adjacent to and parallel with the opposite longitudinal edges of the plate. The plate 11 and the stem 12 of each T section are then prepared to be welded together by removing metal from the stem of each T and from the abutting edges of the plate adjacent thereto, so as to provide a groove between the members for the weld metal. Preferably the metal is removed by the oxy-acetylene process in which heating flames are employed to heat metal to an ignition or kindling temperature and an oxygen jet is provided to be applied to such heated metal. Although this may be done by bevelling the edges with the usual cutting blowpipe, as is well known in the art, I prefer to remove the metal with the low velocity oxygen flame machining process, such as is commonly used for removing defective metal from billets or the like. In flame machining, the oxygen gas stream is directed along each seam formed between the plate 11 and the stems 12 and at an angle thereto, and is progressively applied to successive surface portions along the seam from which metal is to be removed to form a groove 13 of the single U type, as shown in Figs. 3 and 4. In this manner a flame machined surface is produced along an edge of a metallic member, such surface having a curved sectional contour and being of less width than the original width of the edge.

Figure 5:
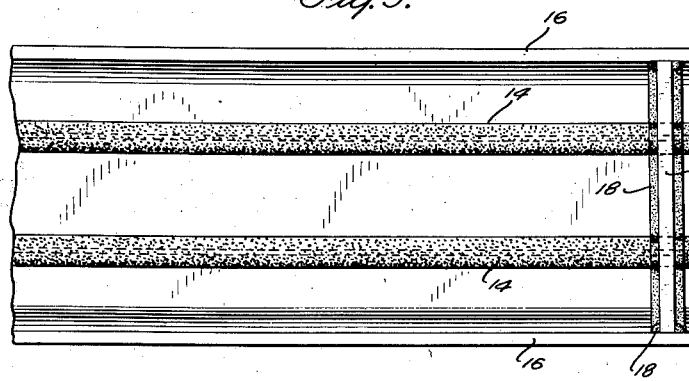
Figs. 5 and 6 are respectively side and end elevations of one end of the completed beam.
Figure 6:
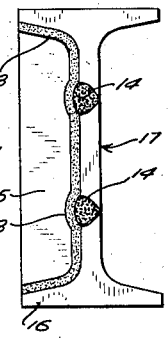

The parallel edges of the stems of the T sections 10 and the plate 11 are joined together by a continuous weld 14 in which weld metal is deposited in the groove 13 which has been formed as shown in Figs. 5 and 6. The fabrication of the beam may be facilitated by simultaneously removing metal from an edge of a beam member and the plate by flame machining the groove and subsequently welding such member and the plate together with a single pass of a pair of blowpipes progressively moved along the seam formed by the beam member and the plate, each pair of blowpipes comprising a flame machining blowpipe and a welding blowpipe. Of course, the flame machining or metal removing blowpipe precedes the welding blowpipe. The first blowpipe produces a U-shaped groove and the other provides heat to fuse the sides of the grooved wall to a heated condition and to fuse the welding rod so that the weld metal is deposited in the groove and welds the members together in the usual manner. One or more seams may be prepared and welded simultaneously by mounting a pair of blowpipes for each seam on a carriage and traversing the seams in a longitudinal direction with a single pass of the carriage. In the preceding operations the welding may be done electrically and in such instances the welding blowpipe may be replaced by suitable electric welding equipment. Thus, in both the gas welding and the electric welding, the molten weld metal may be deposited while the surfaces of the groove are still heated to an elevated temperature.

The beam may be provided with stiffeners 15 inserted between the flanges 16 of the beam and extending transversely across the web 17, as shown in Figs. 5 and 6. Although a continuous fillet weld 18 may be used to unite the adjacent edges of the stiffener to the flange and the web of the finished beam, an intermittent fillet weld may be employed. This construction provides reinforcement for the longitudinal welds 14 and at the same time adds stiffness to the web 17 of the beam.

To produce a camber in a beam of the type just described, the flange members may be arched and then welded to the web member. This may be done by producing a curvature in either the longitudinal edge of the leg of the flange members or the longitudinal edge of the web member or in both of said edges of be joined, and then arching the flange members so that the longitudinal edges of the legs or stems of the flange members conform to the contour of the edge of the web member in such a manner that the opposing edges may be welded together and the flanges provided with the desired camber.

Figures 7 to 16 illustrate a cambered-beam and a method of producing them. As shown in Figs. 7 and 8 the flange members 20 and 21 may be cut from an H section by splitting the H section along the curved line 22 as shown in Fig. 7. In this operation two flange members are formed, each being in the shape of a T section. One of the flange members or T sections 20 has a stem 23 provided with a convexly curved edge 24 and the other T section 21 has a stem 25 provided with a concavely curved edge 26. In the method shown, the web member 27 comprises a plate having parallel longitudinal edges 28. As shown in Figs. 9 and 10, the T section 20 having a stem 23 provided with the convexly curved edge 24 is placed on one side of the web member 27, and the T section 21 having a stem 25 provided with the concavely curved edge 26 is placed on the other side of the web member 27 so that the edges 24 and 26 lie adjacent to the edges 28 and the stems 23 and 25 in the plane of the web member 27. The beam members are clamped together in this position so that the edges 24 and 26 of the stems 23 and 26 abut against the edges 28 of the web member 27 as shown in Figs. 11 and 12. A welding groove 29 is then flame machined between the edges to be joined as shown in Fig. 13. The edges 24 and 26 of the stems 23 and 25 are then welded to the edges 28 of the web member 27 by filling the grooves 29 with weld metal 30 as shown in Fig. 14. In the event that the parts may not be completely welded together at the bottom of the seam, the beam may be turned over and a second groove 31 may be formed between each of the joined edges of the stems 23 and 25 of the flange members 20 and 21 and the web member 27, as shown in Fig. 15, and the parts may be welded together by filling each groove with a line of weld metal 32 as shown in Fig. 16.

The preferred forms of my invention are shown and described herein. Changes in the details as shown may be made without departing from the scope of the invention as defined in the appended claims.

I claim:

1. A built-up camber-beam comprising a web member; a convexly arched flange member having a leg welded to one longitudinal edge of said web member; and a concavely arched flange member having a leg welded to the other longitudinal edge of said web member.

2. The method of fabricating a cambered steel beam or girder comprising shaping the edge of the leg of one flange member and the edge of a web member so that when said edges are opposite each other and the plane of said leg and said web member coincide and the longitudinal center line of said members are parallel to each other, said shaped edges diverge from each other toward each end of said edges from their mid-point; shaping the edge of the leg of another flange member and the other longitudinal edge of said web member so that when said edges are opposite to each other and the plane of said leg and said web member coincide and the longitudinal center line of said members are parallel to each other, said shaped edges converge toward each other from their mid-point toward each end; clamping the opposed edges of said beam members together when so positioned relatively with respect to each other; and butt-welding the contiguous edges of said legs and said web member.

3. The method of fabricating a cambered steel beam or girder comprising providing a convexly curved edge on the leg of one flange member and a concavely curved edge on the edge of the leg of another flange member; arranging said flange members so their curved edge legs shall be in the same plane with the edges of the legs opposed and spaced apart; placing a web plate having straight longitudinal edges in said plane between said edges; bending said flange members until said curved edges are substantially straightened and are contiguous to said straight web plate edges; and butt-welding the edges of said legs to said contiguous web plate edges.

4. A built-up beam comprising a web having substantially straight and parallel edges, and a pair of members each having a straight edge welded to one of the straight edges of said web, the opposite edge of each of said members being curved.

5. A method of fabricating a cambered beam, which comprises cutting a member so as to form a curved edge thereon, shaping said member until said curved edge is substantially straight, and securing the straight edge of such member to the straight edge of a second member.

6. A method of fabricating a cambered beam, which comprises cutting into two sections along a curved path the web of a parallel-sided structural shape, aligning the web members of said sections with an intermediately disposed plate having substantially parallel and straight edges, and compressing said sections against the edges of said plate until the curve-shaped edges of said sections contact the edges of said plate throughout the length of said edges, and thereafter uniting the respective edges by welding.

7. A method of fabricating a cambered beam, which comprises cutting a structural shape longitudinally into two sections, positioning such sections edgewise against the curved edges of a web, compressing said sections and said web until the edges of the former and latter contact each other throughout their length, and subsequently securing said sections to said web.

8. A method of welding uniting steel plates which comprises arranging said plates in such a position that an edge of one plate is adjacent to and opposite an edge of the other plate to form a seam therebetween; progressively applying a heating medium against a portion of one side of each plate at said seam; simultaneously with the application of said heating medium, directing a low velocity stream of oxygen obliquely against the plate portions so heated and lengthwise of said seam in such a manner as to remove metal from less than the initial width of each of such adjacent edges, to form a welding groove extending along said seam; while said plates are in their initial relation and the surfaces of said groove are still heated to an elevated temperature from such groove-forming operation, depositing molten weld metal in and along said groove to unite said plates; then progressively applying a heating medium against a portion of the reverse side of each plate along the unwelded part of said seam; simultaneously with the application of said last-named heating medium, directing a low velocity stream of oxygen obliquely against such heated reverse sides of said plates and lengthwise of said seam, to thereby form a relatively shallow auxiliary welding groove along the unwelded part of said seam; and, while the surfaces of said auxiliary groove are still heated to an elevated temperature from the last-mentioned groove-forming operation, depositing molten weld metal in and along said auxiliary welding groove.

HERBERT H. MOSS.